US012712109B2

(12) United States Patent
Ngoua Teu Magambo et al.

(10) Patent No.: US 12,712,109 B2
(45) Date of Patent: Aug. 18, 2026

(54) SUPPLY CIRCUIT FOR POWER MODULE WITH BUILT-IN ISOLATION TRANSFORMER AND ASSOCIATED POWER MODULE

(71) Applicant: SAFRAN, Paris (FR)

(72) Inventors: Jean Sylvio Ngoua Teu Magambo, Moissy-Cramayel (FR); Thanh Long Le, Moissy-Cramayel (FR); Rabih Khazaka, Moissy-Cramayel (FR)

(73) Assignee: SAFRAN, Paris (FR)

(*) Notice: Subject to any disclaimer, the term of this patent is extended or adjusted under 35 U.S.C. 154(b) by 713 days.

(21) Appl. No.: 18/003,840

(22) PCT Filed: Jun. 28, 2021

(86) PCT No.: PCT/FR2021/051182
§ 371 (c)(1),
(2) Date: Dec. 29, 2022

(87) PCT Pub. No.: WO2022/003285
PCT Pub. Date: Jan. 6, 2022

(65) Prior Publication Data

US 2023/0268112 A1 Aug. 24, 2023

(30) Foreign Application Priority Data

Jul. 3, 2020 (FR) ....................................... 2007073

(51) Int. Cl.
*H01F 27/02* (2006.01)
*B64C 19/00* (2006.01)
*H01F 27/24* (2006.01)

(52) U.S. Cl.
CPC ............ *H01F 27/02* (2013.01); *B64C 19/00* (2013.01); *H01F 27/24* (2013.01)

(58) Field of Classification Search
CPC .......... H01F 27/02; H01F 27/24; H01F 27/22; H01F 2027/2814; B64C 19/00
See application file for complete search history.

(56) References Cited

U.S. PATENT DOCUMENTS

2010/0176660 A1 7/2010 Fouquet et al.
2012/0112866 A1* 5/2012 Matsumoto ............. H01F 27/22 336/61

(Continued)

FOREIGN PATENT DOCUMENTS

DE 102018007042 A1 3/2020
EP 1085536 B1 * 11/2002 ......... H01F 27/2804

OTHER PUBLICATIONS

Bowen and Basu, Exploration of the 3-D Printing of Transformer Structures with Embedded Ferrite Cores, IEEE Transactions on Magnetics, vol. 55, 2, Feb. 2019 (Year: 2019).*

(Continued)

*Primary Examiner* — Thomas J Hong
*Assistant Examiner* — Jose K Abraham
(74) *Attorney, Agent, or Firm* — Bookoff McAndrews, PLLC

(57) ABSTRACT

Electrical power supply circuit for a power module comprising an electrical transformer, a first substrate having a first side including a heat sink and a second side, a second substrate having a first side including a heat sink and a second side, first metal tracks disposed on the second side of the first substrate, second metal tracks disposed on the second side of the second substrate, electrical connectors disposed between the first and second substrates to electrically connect a first metal track to a second metal track, the primary circuit of the electrical transformer comprising a first part of the first metal tracks and a first part of the second metal tracks, and the secondary circuit of the electrical (Continued)

transformer comprising a second part of the first metal tracks and a second part of the second metal tracks.

10 Claims, 1 Drawing Sheet

(56) References Cited

U.S. PATENT DOCUMENTS

| | | | | |
|---|---|---|---|---|
| 2012/0287582 | A1* | 11/2012 | Vinciarelli | H05K 1/11 361/728 |
| 2015/0069572 | A1 | 3/2015 | Khanolkar et al. | |
| 2015/0357113 | A1 | 12/2015 | Scholz | |
| 2018/0233269 | A1* | 8/2018 | Schlieter | H01F 27/28 |
| 2019/0027293 | A1* | 1/2019 | Cheon | H01F 27/2804 |
| 2019/0066907 | A1* | 2/2019 | Schwersenz | H01F 41/12 |
| 2020/0263281 | A1* | 8/2020 | Plotkowski | B22F 5/10 |

OTHER PUBLICATIONS

French Search Report issued in French Application No. FR2007073 on Mar. 17, 2021 (2 pages).

International Search Report with English Translation and Written Opinion issued in International Application No. PCT/FR2021/051182 on Jan. 24, 2022 (10 pages).

* cited by examiner

[Fig. 1]
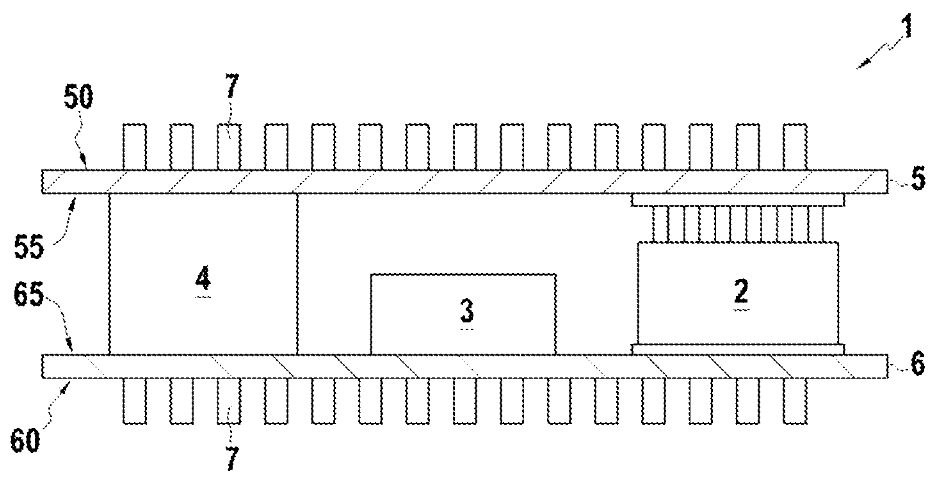
[Fig. 2]
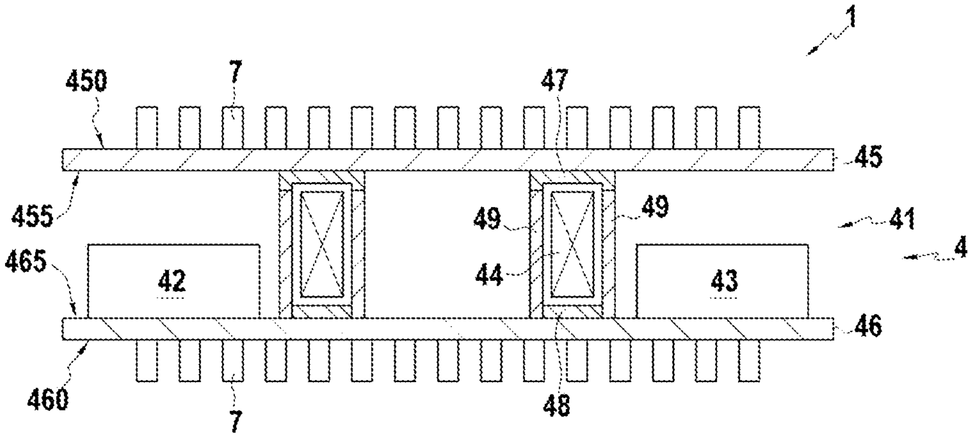
[Fig. 3]
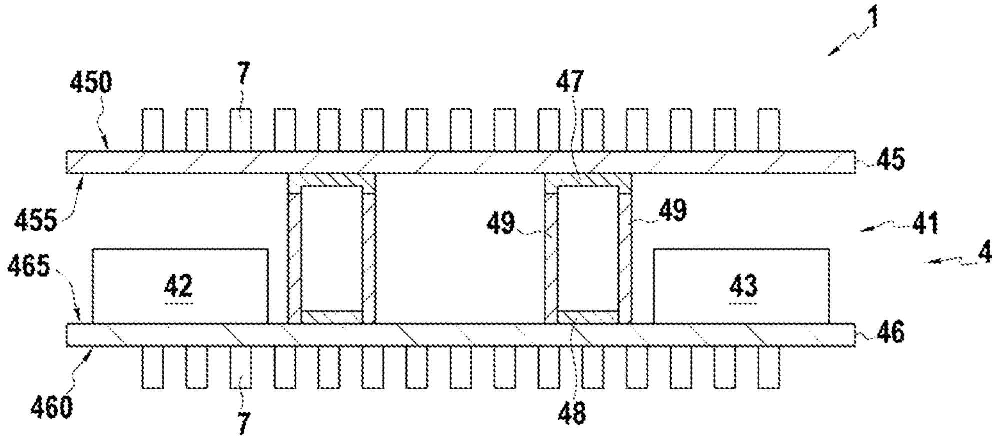

SUPPLY CIRCUIT FOR POWER MODULE WITH BUILT-IN ISOLATION TRANSFORMER AND ASSOCIATED POWER MODULE

CROSS-REFERENCE TO RELATED APPLICATION(S)

This patent application is a U.S. National Stage entry of International Application No. PCT/FR2021/051182, filed on Jun. 28, 2021, now published as WO 2022/003285 A1, which claims priority to French Application No. FR2007073, filed on Jul. 3, 2020.

TECHNICAL FIELD

The invention relates to the supply of power semiconductor modules and more particularly the isolated power supplies.

PRIOR ART

A power module is a circuit using transistors called power transistors, produced for example in IGBT, MOSFET, SiC or GaN HEMTs technology.

The control of these transistors requires an electronic circuit for controlling their gates, known as "gate driver", which provides the necessary gate control signals, from the logic supply voltage of the integrated electronic circuits. It is therefore an electrical interface circuit. In practice it is necessary to isolate the signal part and the power part and one of the solutions consists in using a transformer for this.

A conventional circuit for controlling a power module is produced from an electronic printed circuit board (PCB) and directly uses commercially available isolated power supplies (integrating transformers). But these power supplies have several drawbacks: they have a limited operating temperature range (<150° C.); they have a high stray capacitance (>10 pF); they are too bulky to allow their integration into the power module.

It is also known to produce the power supply circuit and with its transformer inside the PCB. But the operating temperature range remains limited (<150° C.). Moreover, the integration of the magnetic core of the transformer in the PCB weakens the solution because "breaks" can appear following the mechanical stresses exerted during the temperature variations, the thermal expansion coefficients not being the same for the different materials present.

An alternative solution is a transformer integrated into the PCB which does not include a magnetic core (coreless). This solution has the advantage of allowing an operation at temperatures above 150° C., but its integration inside the module requires an additional thermal interface to cool the PCB.

A solution based on the use of a filter inductance between two arms of a power module is also known. The inductance is made by depositing copper on a single-sided substrate of the power module. But the use of a single-sided substrate limits the heat sink capacity of the module and does not allow having an isolation function provided by a transformer.

Moreover, it is well known that the stray elements (capacitances, inductances) present in the power modules impact their performance. In particular, one element to be taken into account in the possibility of integrating an isolated power supply is its equivalent stray capacitance which must be controlled.

DISCLOSURE OF THE INVENTION

The aim of the invention is to provide the isolation of an electrical power supply circuit of a small-sized power module, without excessive heating, with control of the stray capacitance value, allowing its integration into a power module.

According to one object of the invention, an electrical power supply circuit for a power module is proposed, the power supply circuit comprising an electrical transformer including a primary circuit and a secondary circuit.

According to one general characteristic of the invention, the electrical power supply circuit comprises:

- a first substrate having a first side including a heat sink and a second side opposite to the first side,
- a second substrate having a first side including a heat sink and a second side opposite to the first side,
- first metal tracks disposed on the second side of the first substrate, second metal tracks disposed on the second side of the second substrate,
- electrical connectors disposed between the first and second substrates to electrically connect a first metal track to a second metal track and thus form turns, the primary circuit of the electrical transformer comprising a first part of the first metal tracks and a first part of the second metal tracks, and the secondary circuit of the electrical transformer comprising a second part of the first metal tracks and a second part of the second metal tracks.

The second side of the first substrate is therefore disposed facing the second side of the second substrate.

The architecture according to the invention allows having a very compact and small electrical power supply circuit. It also allows limiting the stray elements. More particularly, the stray capacitance between the turns of the primary and secondary circuits can in particular be reduced or monitored by adjusting the distance between the turns and therefore the width of the magnetic circuit.

The architecture of the circuit further allows improving its resistance to high temperatures that is to say to temperatures typically above 150° C. Indeed, the double-sided metal substrate allowing a better cooling, the operating temperature range of the power supply circuit is extended. In practice, the upper limit temperature depends on the magnetic materials, on the isolator and on the fasteners of the electrical connection elements that are chosen.

The reliability of the electrical power supply circuit is also improved. A better mechanical resistance is in particular obtained (in terms of vibrations and thermal cycles) compared to a wound transformer (with thin wire) inserted into the power module or connected to the module by solders.

According to a first aspect of the electrical power supply circuit, the circuit can comprise an electrical isolator made of polymer material in which the electrical elements disposed between the first and second substrates are encapsulated.

The polymer material can be for example an epoxy polymer, a silicone gel or an elastomer. It is advantageously possible to use the same manufacturing method and the same polymer material used to isolate the power semiconductors.

According to a second aspect of the electrical power supply circuit, the circuit can further comprise a magnetic circuit formed by a magnetic core inserted between the two metal substrates and surrounded by at least part of said electrical connectors.

According to a third aspect of the electrical power supply circuit, the magnetic core can be produced by powder injection molding (PIM process) or by a process known as "binder jetting".

According to a fourth aspect of the electrical power supply circuit, the electrical transformer can be devoid of mechanical core.

Having an electrical transformer devoid of magnetic core allows improving the resistance of the transformer to high temperatures that is to say to temperatures above 150° C.

According to a fifth aspect of the electrical power supply circuit, the first substrate and the second substrate as well as the electrical connectors connecting the two substrates can be manufactured by additive manufacturing.

In another aspect of the invention, there is proposed a power module comprising electrical power components, a circuit for controlling the module, a circuit for supplying the module as defined above and first and second module substrates each having a first side including a heat sink and a second side opposite to the first side, the second sides of the first and second substrates being disposed facing each other, and the module supply circuit, the module control circuit and the electrical power components being disposed between the first and second substrates, the first substrate of the electrical power supply circuit being formed by a part of the first substrate of the module and the second substrate of the electrical power supply circuit being formed by a part of the second substrate of the module.

In another aspect of the invention, an aircraft comprising at least one power module as defined above is proposed.

BRIEF DESCRIPTION OF THE DRAWINGS

FIG. 1 is a schematic representation of a power module according to one embodiment of the invention.

FIG. 2 schematically represents an electrical power supply circuit of the power module of FIG. 1 according to a first embodiment.

FIG. 3 schematically represents an electrical power supply circuit of the power module of FIG. 1 according to a second embodiment.

DESCRIPTION OF THE EMBODIMENTS

FIG. 1 schematically represents a power module according to one embodiment of the invention.

The power module 1 comprises electrical power components 2, such as power transistors or other electronic semiconductor components, a circuit for controlling 3 the power module 1 and an electrical circuit for supplying 4 the power module 1.

The power module 1 further comprises a first substrate 5 having a first side 50 and a second side 55, as well as a second substrate 6 having a first side 60 and a second side 65. The second side 55 of the first substrate 5 is disposed facing the second side 65 of the second substrate 6. The electrical power components 2, the control circuit 3 and the electrical power supply circuit 4 are disposed between the first substrate 5 and the second substrate 6. More particularly, the electrical power components 2, the control circuit 3 and the electrical power supply circuit 4 are each disposed between second side 55 of the first substrate 5 and the second side 65 of second substrate 6.

The first side 50 of the first substrate 5 and the first side 60 of the second substrate each include a heat sink 7.

FIG. 2 schematically represents the electrical power supply circuit 4 of the power module 1 of FIG. 1 according to a first embodiment.

The electrical power supply circuit 4 comprises an electrical transformer 41 including a primary circuit 42 and a secondary circuit 43, and a magnetic core 44. The power supply circuit 4 further comprises a first substrate 45 formed by a portion of the first substrate 5 of the power module 1, and a second substrate 46 formed by a portion of the second substrate 6 of the power module 1.

The first substrate 45 of the power supply circuit 4 has a first side 450, coincident with the first side 50 of the first substrate 5 of the power module 1, on which the heat sink 7 associated with the first substrate 5 is mounted.

The second substrate 46 of the power supply circuit 4 has a first side 460, coincident with the first side 60 of the second substrate 6 of the power module 1, on which the heat sink 7 associated with the second substrate 6 is mounted.

The first substrate 45 of the power supply circuit 4 has a second side 455 opposite to its first side 450, and the second substrate 46 of the power supply circuit 4 has a second side 465 opposite to its first side 460.

The electrical power supply circuit 4 further comprises first metal tracks 47 disposed on the second side 455 of the first substrate 45 of the electrical power supply circuit 4, and second metal tracks 48 disposed on the second side 465 of the second substrate 46, as well as electrical connectors 49 disposed between the second side 455 of the first substrate 45 of the electrical power supply circuit 4 and the second side 465 of the second substrate 46 of the electrical power supply circuit 4 to electrically connect a first metal track 47 to a second metal track 48 and thus form the turns of the primary and secondary circuits.

The primary circuit 42 of the electrical transformer 41 comprises a first part of the first metal tracks 47 and a first part of the second metal tracks 48, these first and second tracks 47 and 48 being connected by corresponding electrical connectors 49 to form the turns of the primary circuit, and the secondary circuit 43 of the electrical transformer 41 comprises a second part of the first metal tracks 47 and a second part of the second metal tracks 48, these first and second tracks 47 and 48 being connected by corresponding electrical connectors 49 to form the turns of the secondary circuit.

The power module 1 also comprises an electrical isolator made of polymer material, such as elastomer or epoxy, extending between the first substrate 5 and the second substrate 6, and in which the electrical elements disposed between the first and second substrates 5 and 6 are taken that is to say the electrical components 2, the control circuit 3, and the transformer 41.

FIG. 3 schematically represents the electrical power supply circuit 4 of the power module 1 of FIG. 1 according to a second embodiment.

The electrical power supply circuit 4 illustrated in FIG. 3 differs from the one illustrated in FIG. 2 in that the electrical transformer 41 is devoid of magnetic core 44, which allows improving the resistance of the transformer to high temperatures that is to say to temperatures above 150° C.

The invention claimed is:

1. A power module comprising electrical power components, a circuit for controlling the power module, an electrical power supply circuit, and a first power module substrate and a second power module substrate each having a first side including a first heat sink and a second side opposite to the first, the second sides of the first and second power module substrates being disposed facing each other, and the electrical power supply circuit, the control circuit, and the electrical power components being disposed between the first and second power module substrates, a first substrate of the electrical power supply circuit being formed by a part of the first power module substrate and a second substrate of the electrical power supply circuit being formed by a part of the second power module substrate, the electrical power supply circuit comprising an electrical transformer including a primary circuit and a secondary circuit, wherein the electrical power supply circuit comprises:

the first substrate having a first side including the first heat sink and a second side opposite to the first side, the second substrate having a first side including a second heat sink and a second side opposite to the first side, wherein the second side of the second substrate faces the second side of the first substrate, first metal tracks disposed on the second side of the first substrate, and second metal tracks disposed on the second side of the second substrate, and electrical connectors disposed between the second side of the first substrate and the second side of the second substrate, the electrical connectors electrically connecting the first metal tracks to the second metal tracks, wherein the primary circuit of the electrical transformer is electrically connected to a first part of the first metal tracks and a first part of the second metal tracks, and the secondary circuit of the electrical transformer is electrically connected to a second part of the first metal tracks and a second part of the second metal tracks, wherein the electrical power supply circuit includes an electrical isolator made of polymer material in which electrical elements disposed between the first and second substrates are encapsulated.

2. The electrical power supply circuit according to claim 1, further comprising a magnetic circuit formed by a magnetic core inserted between the first and second metal tracks and surrounded by at least a part of said electrical connectors.

3. The electrical power supply circuit according to claim 2, wherein the magnetic core is produced by an additive manufacturing process such as a powder injection molding process.

4. The electrical power supply according to claim 1, wherein the electrical transformer is devoid of a magnetic core.

5. The electrical power supply circuit according to claim 1, wherein the first substrate and the second substrate are manufactured by additive manufacturing.

6. An aircraft comprising at least one power module according to claim 1.

7. The electrical power supply circuit according to claim 1, wherein the first substrate and the second substrate are manufactured by additive manufacturing.

8. The electrical power supply circuit according to claim 2, wherein the first substrate and the second substrate are manufactured by additive manufacturing.

9. The electrical power supply circuit according to claim 3, wherein the first substrate and the second substrate are manufactured by additive manufacturing.

10. The electrical power supply circuit according to claim 5, wherein the first substrate and the second substrate are manufactured by additive manufacturing.

* * * * *